March 5, 1940.　　　　A. H. DICKINSON　　　　2,192,729
CALCULATING MACHINE
Filed Nov. 10, 1934　　　8 Sheets-Sheet 3

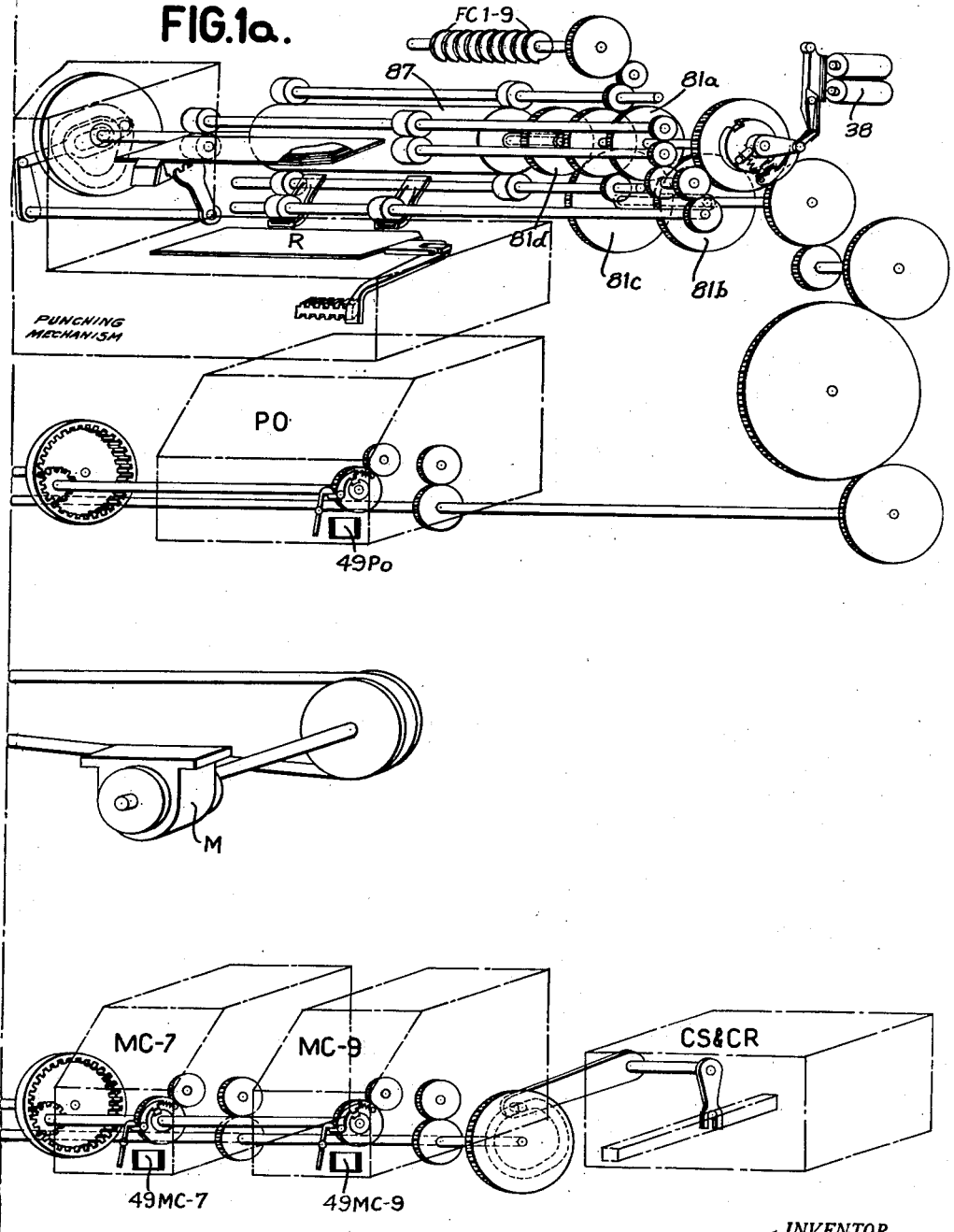

March 5, 1940.    A. H. DICKINSON    2,192,729
CALCULATING MACHINE
Filed Nov. 10, 1934    8 Sheets-Sheet 4

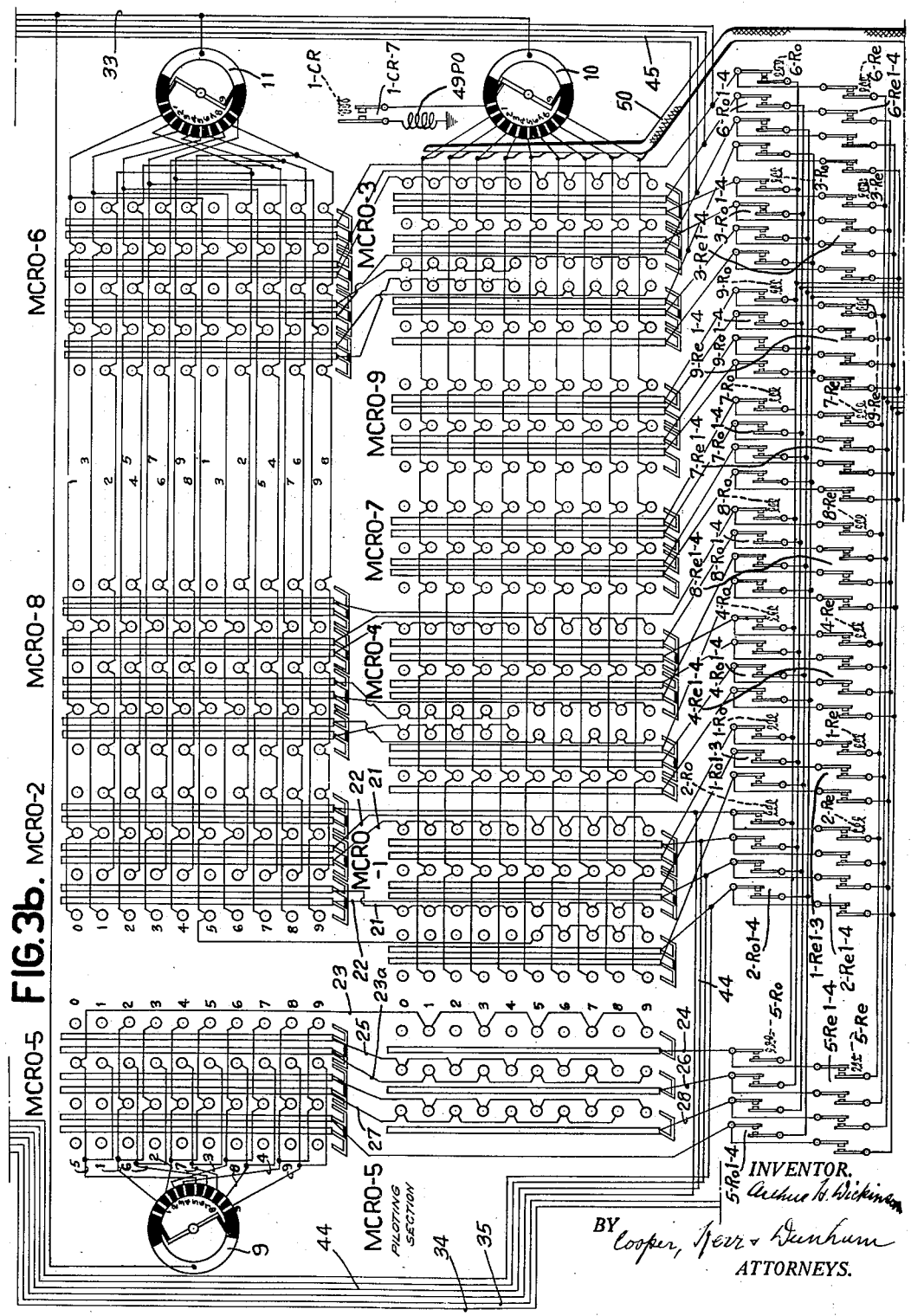

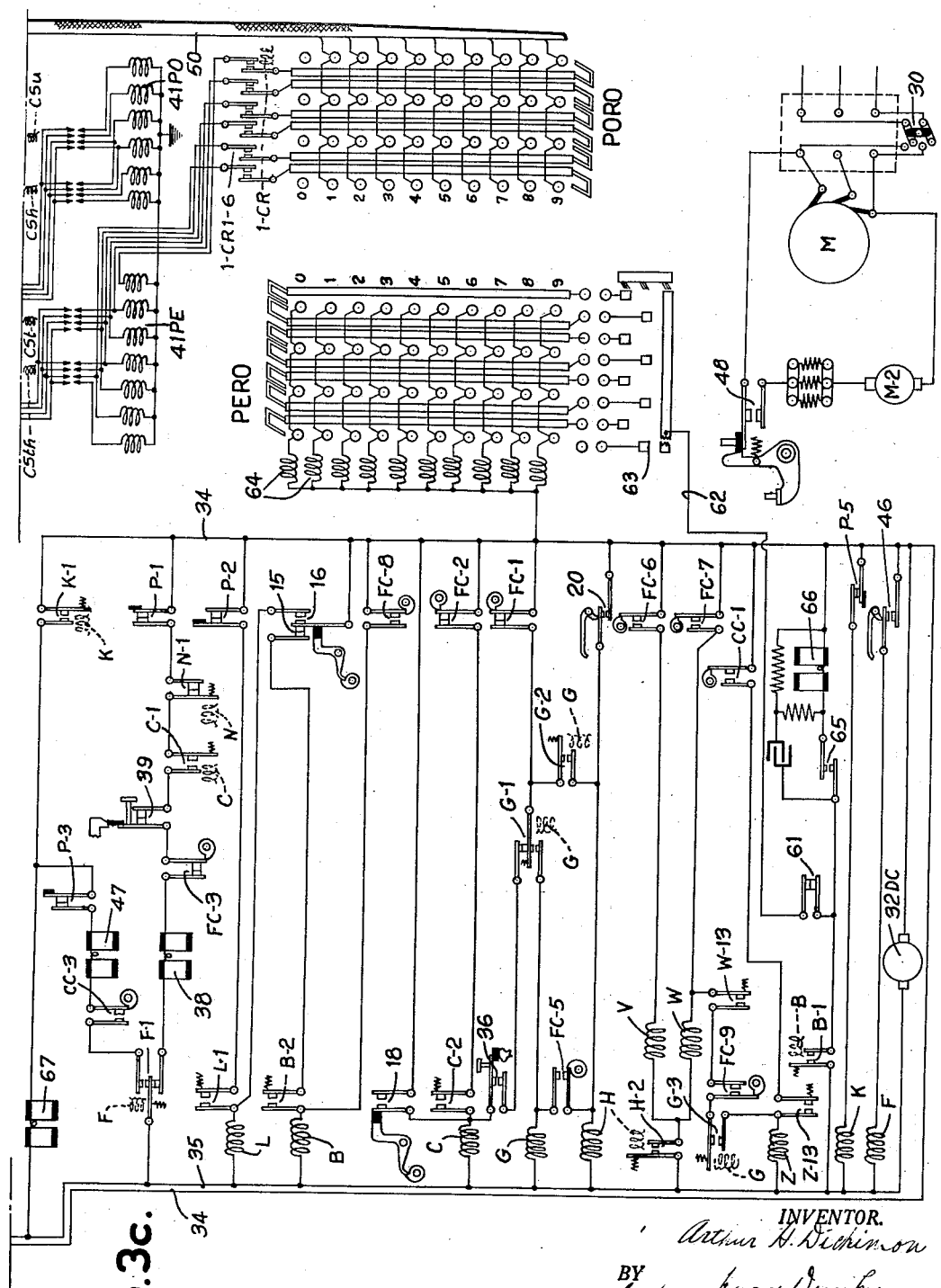

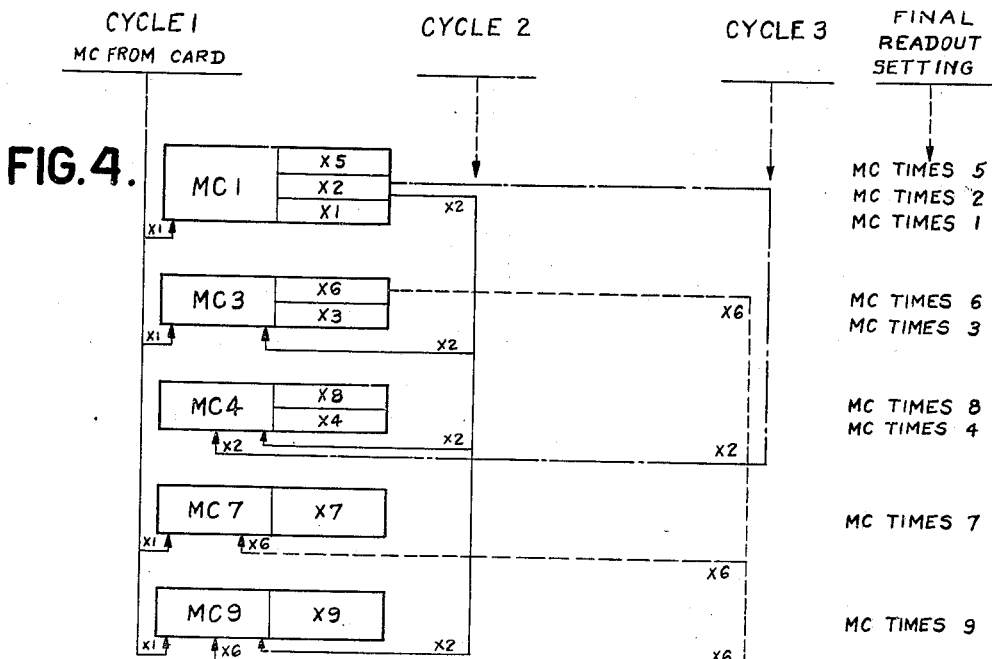
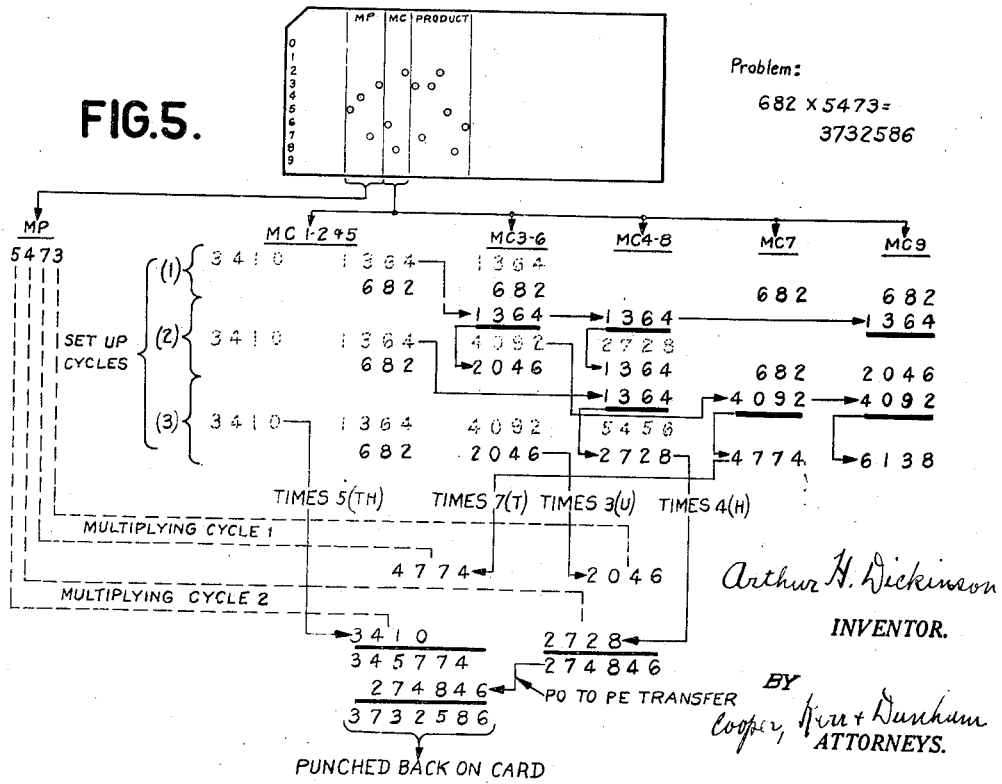

March 5, 1940. A. H. DICKINSON 2,192,729
CALCULATING MACHINE
Filed Nov. 10, 1934 8 Sheets-Sheet 8

Patented Mar. 5, 1940

2,192,729

UNITED STATES PATENT OFFICE 2,192,729

CALCULATING MACHINE

Arthur H. Dickinson, Brooklyn, N. Y., assignor to
International Business Machines Corporation,
New York, N. Y., a corporation of New York Application November 10, 1934, Serial No. 752,520

26 Claims. (Cl. 235—61.6)

This invention relates to accounting machines and it more particularly relates to multiplying machines of the general class in which multiplication is effected by the addition of pre-set up sub-products under the selection and control of an entered multiplier and in which the sub-products are set up and based upon various multiples of an entered multiplicand.

The present application constitutes an improvement in the machine shown in the copending application of James W. Bryce, Serial No. 748,056, filed October 12, 1934. In the machine of that application, straight multiples of entered multiplicands were available for readout from readout devices associated with six entry receiving devices. Certain entry receiving devices had doubling readouts associated therewith as well as straight readout devices so that either double the amount or the straight amount set up in the corresponding entry receiving device could be read out. In this way the number of entry receiving devices required were reduced from 9 to 6.

According to the present invention the number of entry receiving devices required for the sub-product settings is still further reduced, five of such entry devices sufficing in the machine of the present invention.

The foregoing feature comprises one object of the present invention.

A further object of the present invention resides in the provision of a novel form of readout adapted for association with one of the entry receiving devices which will make it possible to read out directly five times the amount of the entry standing in the entry receiving device.

A further feature of this novel readout resides in the provision of a readout wherein it is possible to read out directly for entry into an accumulator, one-half of the amount standing in the associated entry receiving device.

In machines of the general class to which the present invention relates, speed of operation is a desideratum. Such speed of operation has heretofore been obtained in machines of the partial product type by concurrently entering left and right hand components of partial products into separate accumulators and thereafter in a single cycle gathering the right and left hand components of partial products together in a single accumulator. In such partial product machines, the speed of operation, so far as the number of computing cycles themselves were concerned, (i. e. actual multiplying cycles and gathering together cycles) was such that one computing cycle was required for each column of the multiplier containing a significant digit and in addition one extra gathering together cycle was required to place the partial product components in one accumulator. The computing speed of such partial product machines, so far as computing and gathering together cycles was $n+1$, where $n$ equalled the number of columns or orders of the multiplier containing significant digits.

According to the machine of the aforementioned Bryce application, no extra gathering together cycle was required and the number of calculating cycles equalled only $n$.

One of the features of and a further object of the present invention resides in the provision of means for still further increasing the computing speed of multiplying machines. According to the disclosed embodiment of the present invention the computing speed is further reduced, being equal to $$\frac{n}{2}+1$$

for a multiplier amount comprising significant digits in all orders and with an even number of significant digits. By "computing speed" is meant final result computing speed which disregards the card handling cycles and multiplicand building up cycles. Final result calculating for computing comprises the introduction of amounts into the final result accumulator and the gathering together of the amounts in one accumulator. By extending the principles of the present invention the speed may be further increased to such speed as $$\frac{n}{3}+2 \text{ or } \frac{n}{4}+2$$

and this may be done without departing from the principles of the present invention.

A further object of the present invention resides in the provision of a multiplying machine in which concurrent multiplication may be effected of a plurality of columns of the multiplier.

A further object of the present invention resides in the provision of an improved form of cycle controller adapted to control the skipping of calculating cycles related to columns of the multiplier where zeros appear and to also effect the control of concurrent multiplier entries of products pertaining to different columns of the multiplier into product receiving devices.

A further object of the present invention resides in the provision of an improved cycle controller in which the control is effected concurrently by pairs of columns and in which the arrangement is such that if a zero is present in a particular column the control immediately shifts to another column and changes the pair relation.

A further object of the present invention resides in the provision of a cycle controller for machines of this class in which provision may be made for entering products not in a maintained order of succession as heretofore but in a changeable order of succession.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figs. 1 and 1a, taken together, show somewhat diagrammatically the driving mechanism of the machine and the various sections thereof;

Fig. 2 is a card feed, card handling and sensing section of the machine;

Figs. 3a, 3b and 3c, taken together and arranged vertically in the order named, show the circuit diagram of the machine;

Fig. 4 is a diagrammatic view showing the manner in which the multiple components of the multiplicand are set up upon successive machine cycles;

Fig. 5 is a diagrammatic view showing a typical computation as performed by the machine and the sequence of various entry operations;

Figure 6:
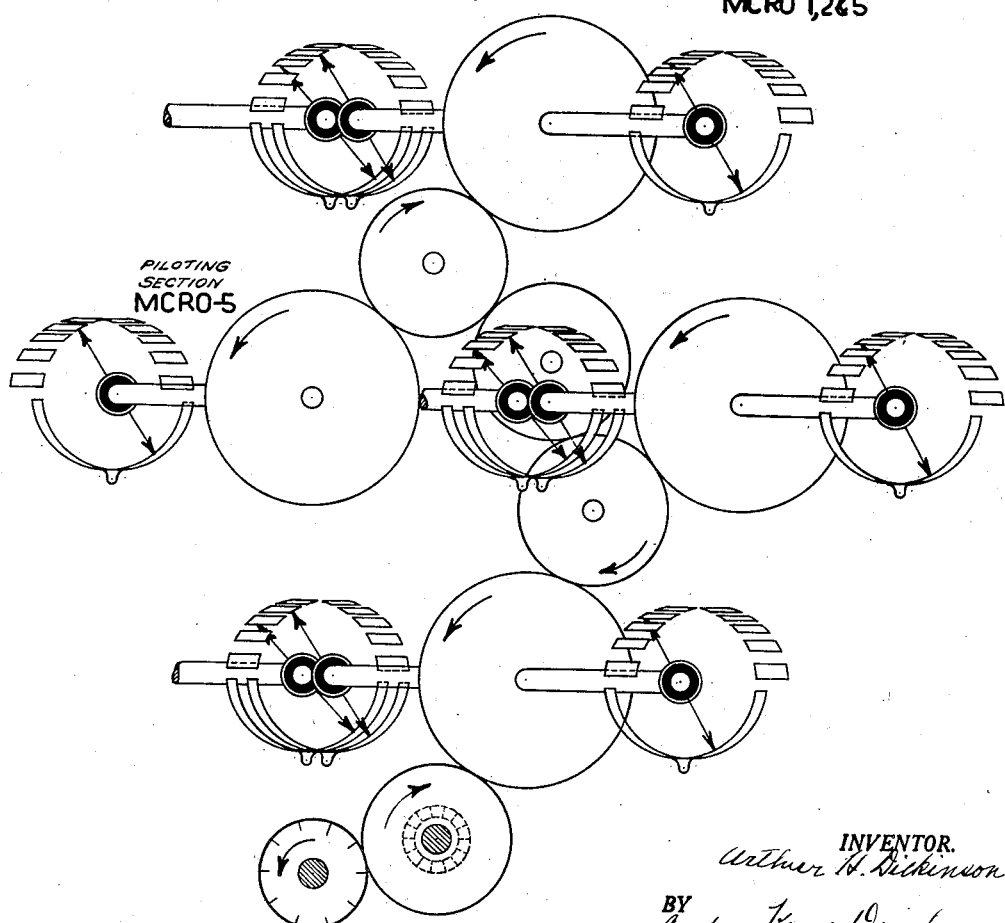
Figure 8:
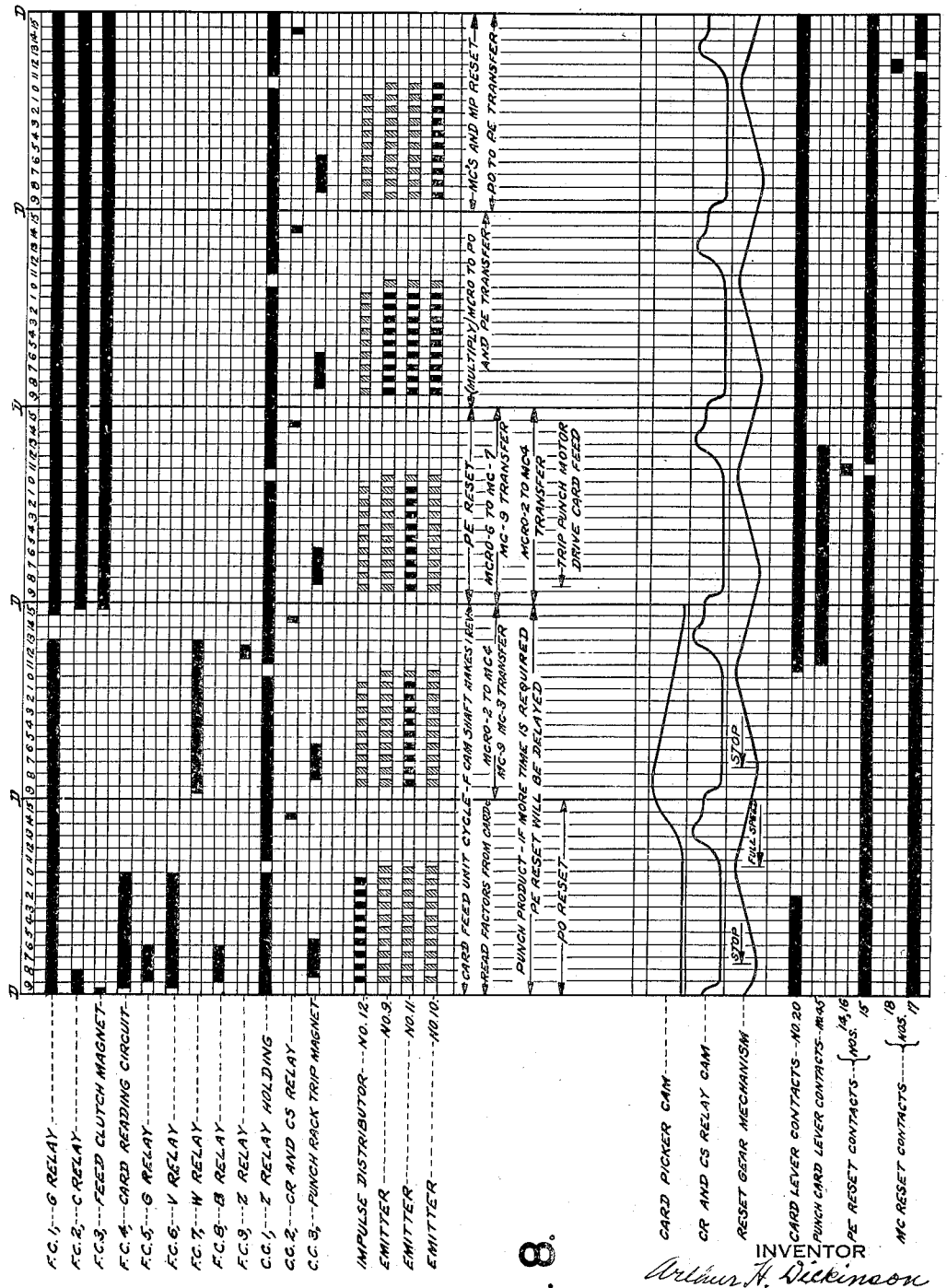

Fig. 6 is a diagrammatic view showing one of the readout mechanisms which is used in the present machine for setting up and providing for a readout of certain multiple components of the multiplicand. This particular readout permits the reading out of the multiplicand×1, the multiplicand×2, and the multiplicand×5; and Fig. 7 shows a modification of the wiring of one of the readout devices so that it may directly read out one-half the entry standing in the related entry receiving device;

Fig. 8 shows the timing diagram of the machine.

Before describing the construction of the machine to which the present invention is applied, the general principles upon which the machine operates and the general mode of operation will be set forth.

According to the present invention, the machine carries out multiplication in the following manner. The multiplier and multiplicand are first entered into the machine. One multiplier entry receiving device is provided and according to the present embodiment of the invention five multiplicand entry receiving devices are also provided. One of the multiplicand entry receiving devices is provided with a special form of readout which is of such nature that upon the entry of the multiplicand into the corresponding entry receiving device there is the immediate possibility of reading out from the associated readout of the multiplicand itself or the multiplicand×1, the multiplicand×2 and the multiplicand×5. This multiplicand entry device may be termed the MC—1 device. At the same time that an entry is made direct from the card into the MC—1 device an entry is made into the MC—3, the MC—7 and the MC—9 device (see Fig. 4). Upon the next cycle following the entry cycle in which the multiplicand is entered from the card, there is a readout from the ×2 readout section of the MC—1 device and an entry of the multiplicand×2 into MC—3, MC—4 and MC—9. Thereafter upon the following or third cycle there is a readout from the ×2 section of the MC—1 device and an entry of such multiplicand×2 amount into MC—4. Concurrently with this entering operation there is a readout of double the amount of the multiplicand×3 or the multiplicand×6 from the doubling readout section of the MC—3 device and there is an entry of this multiplicand×6 amount into MC—7 and MC—9. It may be explained that the MC—3 device has a doubling readout section so that the MC×6 can be read out therefrom and so that MC×3 can also be read out from another section. The MC—4 device likewise has a doubling readout section so that the MC×8 can be read out therefrom and it has a straight readout section so that MC×4 can be read out. It will accordingly be appreciated that at the end of the third cycle as shown in Fig. 4, it will be possible to read out any one of nine possible multiple components of the multiplicand from various available readout sections, that is, from the readout associated with the MC—1 entry device, it is possible to read out MC×5 or MC×2 or MC×1 and from the readout associated with the MC—3 entry device it is possible to read out MC×6 or MC×3 and so on.

It will accordingly be appreciated that after the foregoing setups are made, any multiple of the multiplicand from one to nine is available for use as a possible sub-product in the subsequent computation. The machine thereafter automatically uses the entered multiplier to control readout operations from the various readout sections of the various multiplicand entry receiving devices and to control the entry of such multiple multiplicand amounts or sub-products into product receiving means.

According to another feature of the present invention it is possible to multiply concurrently by two columns of the multiplier in the same operation. Heretofore in various multiplying machines of the prior art it was the practice to utilize two product accumulators, one being for left hand components of partial products and the other for right hand components of partial products and in the operation of the machine such right hand and left hand partial product components were entered concurrently. However, according to the present invention there are no left hand and right hand components of partial products, but in lieu thereof there are complete sub-products available for entry into the product receiving means. It is accordingly possible to use a double product accumulator, one, for example, for sub-products based upon odd columns of the multiplier and the other for even columns and then in the operation of the machine two sub-products based upon and related to two denominational columns of the multiplier can be entered at the same time by properly controlling the entry into these product accumulators.

According to the present embodiment a cycle controller is likewise employed for controlling the entry of sub-products into the product accumulators. This cycle controller provides for the skipping of a column of the multiplier if a zero appears in such column. Even with the cycle controller the sections still may be termed "odd" or "even" receiving stations because in the actual operation of the machine there may be a mere skipping of an entry into an odd or even section or both. After the sub-products are entered into the odd or even sections of the product accumulators for all of the related columns of the multiplier there is a further operation in which the accumulations of sub-products standing in one product accumulator are transferred to the other product accumulator. The entire product is then available for readout from the readout section of this last mentioned accumulator and the result may be recorded upon the record or otherwise.

It will be accordingly appreciated that the actual multiplying operation of this machine is extremely fast. With previous machines of the prior art the minimum number of entry cycles for entering product results into the machine and gathering them together into the one accumulator comprised $n+1$ cycles where $n$ equalled the number of significant digit columns of the multiplier. According to the present invention the number of such cycles is $$\frac{n}{2}+1$$

and it will be appreciated by providing further multiple sections of product accumulators that the operation time may be further shortened. For example, the principles of the present invention could be extended to a machine in which there were three or four, or even more product accumulators so that three or four or more sets of sub-products pertaining to different columns of the multiplier could be entered simultaneously. There would then have to be two or more gathering together operations and the speed of the operation of such machine would be $$n+2 \text{ or } \frac{n}{4}+2$$

and so on.

The computing speed advantages of the present machine will be apparent from the foregoing table where $n$ is equal to the number of significant digit columns of the multiplier. It will seem that the speed advantage appears particularly in computations involving a large number of multiplier significant digits. With an eight digit multiplier previous partial product machines required nine computing cycles. The machine of the Bryce application required eight, whereas the embodiment here described requires five cycles. The use of additional product accumulators does not materially increase the speed for an eight digit computation, i. e. with four product accumulators the increase is only from 5 to 4. Such additional accumulators might be desirable however for excessively large computations. For example, with a sixteen digit multiplier the present machine would require nine cycles whereas a four accumulator machine would require six cycles.

In the foregoing discussion of speeds and in the illustrative table below, it is assumed that the multiplier comprises significant digits in all orders and that there are an even number of such denominations when the product accumulators are even in number. More definitely $n$ may be assumed to be any even multiple of the number of product accumulators.

| Type of machine | Computing cycle formula | Computing cycles required — Number of significant digits in multiplier amount 1 2 3 4 5 6 7 8 | Number of product entry receiving devices |
|---|---|---|---|
| Partial products multiplier. | $n+1$ | 2 3 4 5 6 7 8 9 | 2 |
| Multiplier of Bryce application Ser. No. 748,056. | $n$ | 1 2 3 4 5 6 7 8 | 1 |
| This invention | $\frac{n}{2}+1$ | 2 2 3 3 4 4 5 5 | 2 |
| Extension of this invention. | $\frac{n}{3}+2$ | 3 3 3 4 4 4 5 5 | 3 |
| Extension of this invention. | $\frac{n}{4}+4$ | 3 3 3 3 4 4 4 4 | 4 |

*Machine drive*

The accounting machine to which the present invention is shown as applied, so far as the various units and the manner of drive is concerned, is substantially the same as the machine shown and described in United States patents to Cunningham, No. 1,933,714 and Oldenboom, No. 1,944,665, to which reference may be had for a fuller description of the general operation of the various units and the manner of drive.

Figure 1:
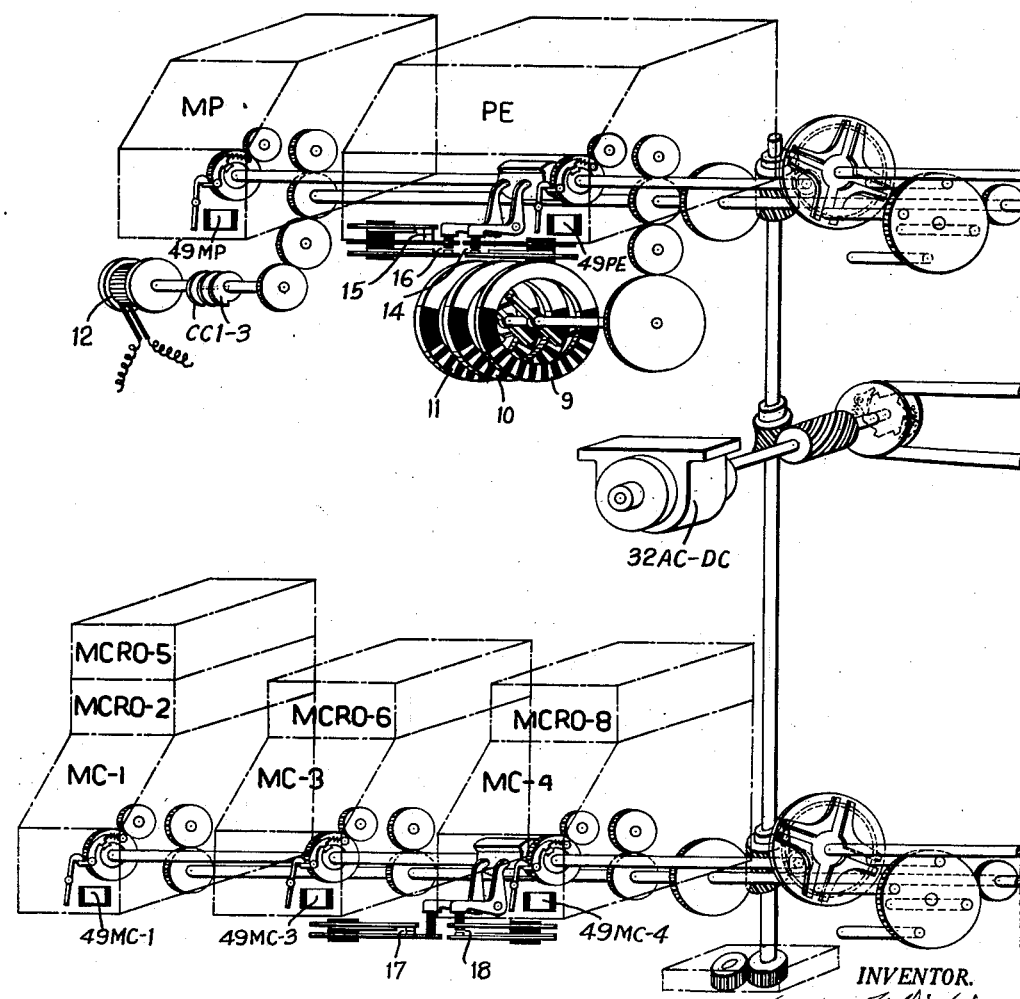

A creeping form of drive is provided for the contact roll 81 (Fig. 1a). The creeping drive includes supplemental gearing 81a, 81b, 81c and 81d. The machine includes an entry receiving device for the multiplier designated MP on Fig. 1. On this figure there is also shown a product accumulator for receiving the even sub-products designated PE. For receiving the multiplicand and the aforesaid multiples of the multiplicand, five multiplicand entry receiving devices are provided which are designated MC—1, MC—3 and MC—4 on Fig. 1 and MC—7 and MC—9 on Fig. 1a. On Fig. 1a, there is also shown the product accumulator for receiving the products which correspond to odd columns of the multiplier. This accumulator is designated PO. On Fig. 1 there is also shown diagrammatically the supplemental readout sections, such supplemental readout sections being designated MCRO—2, MCRO—5, MCRO—6 and MCRO—8.

Of course, there are preliminary setting up cycles required as in many multiplying machines. In the present machine, three preliminary cycles are required for setting up the various components of the multiplicand. During two of these cycles there is feeding of the record card.

Also shown on Fig. 1a are various column shift and control relays designated CS and CR. The multi-contact relays in this unit are of the type shown in the Cunningham patent and are operated as described therein.

As explained before, the MC—1, the MC—3 and the MC—4 entry receiving devices have supplemental sections, MC—1 having an MCRO—2 readout section and an MCRO—5 section as well as the usual MCRO—1 section. The MC—3 entry receiving device has an MCRO—3 readout section and an MCRO—6 section and the MC—4 entry receiving device has an MCRO—4 and an MCRO—8 section associated therewith.

The machine also includes three impulse emitters designated 9, 10 and 11 (Fig. 1) which are driven in the indicated manner.

In the present machine there are nine FC cam contacts designated FC—1 to 9 inclusive on Fig. 1a. The machine also includes cam contacts CC—1 to 3 (Fig. 1) driven from the counter drive shaft in the indicated manner. The usual impulse distributor 12 is also provided.

The PE accumulator resetting mechanism controls two sets of contacts, one set designated 14 comprising a pair of contacts which are adapted to be closed on reset and the other set being a three-blade contact arrangement involving two pairs of contacts 15 and 16. Contacts 15 open upon reset and contacts 16 close upon reset. Upon one MC entry receiving device, for example the MC—4 entry receiving device, the reset mechanism controls two pairs of contacts designated 17 and 18. Contacts 17 open upon reset and contacts 18 close upon reset.

Figure 2:
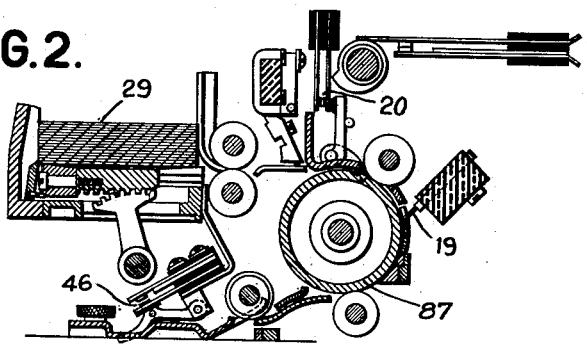

Referring now to Fig. 2, the card handling and sensing section of the machine is generally the same as in the Oldenboom Patent No. 1,944,665. The readout or sensing brushes are shown and designated 19. The customary card lever contacts 20 are also provided.

Complete details of the punch are not shown herein as they are substantially the same as the punch described in the aforementioned patents. A fragment of the punch is shown in Fig. 1a in proximity to the card R in the entering section of the punch.

According to the present invention the machine is intended to handle multiplier entries of a maximum of four columns and multiplicand entries of a maximum of three columns. Obviously the machine may have a greater capacity. Upon a card entering the sensing section of the machine, the sensing brushes 19 sense the multiplier and multiplicand fields of the card and enter the multiplier into the MP receiving device and also enter the multiplicand concurrently into various of the multiplicand entry receiving devices as indicated in Figs. 4 and 5 under first set up cycles. Upon the following second and third cycles, the further entries are made as indicated in these figures. After the setups are made the machine is ready to proceed with multiplication, which operation is effected by reading out concurrently a plurality of multiples of the multiplicand or complete sub-products from a pair of selected readout sections in accordance with the amount of the multiplier in the related columns. This operation is under the control of the entry which is standing in the MP entry device. After the operation pertaining to say the units and tens order of the multiplier is completed there is a further entry operation for succeeding orders of the multiplier. In the next entering cycle there would be an entry of sub-products according to the multiplier amount in the hundreds and thousands orders. Following this there is an operation in which the accumulation of sub-products in one products accumulator is transferred over to the other accumulator. Thereafter the machine is ready to record back upon the record from which the multiplier and multiplicand factors were derived, the product obtained by the operation of the machine.

As explained before, a form of cycle controller is provided to eliminate idle machine cycles where zeros appear in the multiplier.

The machine also includes punch controlled contacts which are generally similar to correspondingly located punch controlled contacts in the Cunningham and Oldenboom patents above referred to.

Readouts

The readouts associated with the various entry receiving and product accumulating devices are generally similar to those previously used in the art with the exception of the readouts which are associated with the MC—1, the MC—3 and the MC—4 entry receiving devices. All of these entry receiving devices have one section for reading out directly the amount standing in the related entry receiving device. In certain entry receiving devices this section is of dual character and it cooperates with another section so that the direct amount as well as double the amount may be read out. The readouts for MC×1 and MC×2 associated with MC—1 are identical with the readouts for MC×3 and MC×6 and for MC×4 and MC×8 and this construction will be first described, particular reference being made to MC×1 and MC×2, as the others are identical. Associated with the MC—1 entry device is an MCRO—1 readout shown on Fig. 3b of the circuit diagram. Driven from this readout is another readout MCRO—2. Both the MCRO—1 and MCRO—2 readouts are of the so-called dual type. The MCRO—1 readout has one section which is wired for direct readout of the amount of the multiplicand standing in the MC—1 accumulator. The MCRO—2 readout is so wired to the emitter 11 that any readout therefrom will be double that of the brush position. For example, if the units brush of the MCRO—2 readout is standing on the spot 7, by tracing the wiring to the emitter it will be noted that there will be an actual readout of 4 which is twice 7 in the units place. However, when the double amounts are to be read out within the range from the 5 to the 9 positions, the readout from the next higher order column must be increased by one, that is, if there is an entry of 19 into MC—1, the actual amount read out from MCRO—2 must be 38, the tens column reading 1×2+1=3. This is provided for by extending the readout circuits from the tens, hundreds and higher order columns of the MCRO—2 readout to an extra section of the MCRO—1 readout. Wiring 21 and 22 is provided for this purpose. It will be noted that wiring 22 extends to spots 5 to 9 inclusive on the extra section of the MCRO—1 readout and the wiring 21 extends to spots 0 to 4 inclusive of such section of the MCRO—1 readout. Accordingly, one section of the MCRO—1 readout pilots the reading to be derived from MCRO—2 increasing the readout therefrom by one in the next higher order column when required.

The special arrangement of wiring from the emitter 11 to the MCRO—2 readout provides for the required doubled amount to be read out. As stated before, the other section of the MCRO—1 readout is utilized for a direct or straight readout of the amount standing in the related counter.

Referring now to Fig. 6, here is shown diagrammatically the drive for the readouts associated with the MC—1 entry receiving device. On the lower line are shown the straight readout section and the supplemental piloting section. On the next shaft line there are shown the MCRO—2 dual sections. Driven from the MCRO—2 sections by the intermediate gearing shown is a supplemental readout section for reading out the multiplicand times 5. It also comprises a piloting section shown to the extreme left in Fig. 6 and labeled with the legend "Piloting section MCRO—5" and an upper section of dual type which is shown at the extreme top of Fig. 6. The special wiring for reading out five times the amount of the entry in the MC—1 device will now be described with reference to Fig. 3b of the circuit diagram. In this figure the piloting section is shown at the bottom and is so labeled. If an amount in a units order of the MC—1 entry receiving device stands on an odd number, for example a 5 spot, the five times multiple of that amount in the units column will always be a 5. There will or may be, of course, a carry increment in addition. On the other hand, if the amount in the units order of MC—1 was an even amount, the even amount multiplied by 5 would always be zero. This principle is utilized in the construction of the readout. It will be noted that wiring 23 (Fig. 3b) extends to the odd number spots of the piloting section and that such wiring extends up to a transverse bus which is connected to the 5 spot of the emitter 9. Accordingly, if an entry were either 1, 3, 5, 7 or 9 in the units column, a 5 representing impulse would flow out to the outgoing line 24 from the piloting section because of the position of the brush in the piloting section.

The construction of the readout may be best understood by considering typical problems. Suppose 65 is set up in the MC—1 entry receiving device. In this event the units order setting will be odd and the tens order setting will be even. The direct tens order component will therefore be zero but this must be supplemented by the carry increment component from the units order. Such carry component for a setting of 5 in the units order will be 2 so that 2 will be read out from the tens order providing the tens order be even. On the other hand, if the tens order setting were odd, for example for an MC—1 entry of 75, the readout from the tens order must be an amount of 5 which would be the direct amount in the tens order, but such amount of 5 must be increased by the carry increment from the units order. This carry increment is 2 and therefore the readout from the tens order should be 7. This readout structure may best be understood by tracing the wiring for a readout of 65×5 and for a readout of 75×5. If 65×5 is to be read out, the brush setting in the piloting section will be on 5 in the units column. With the emitter 9 in operation, an emission of a 5 impulse will flow out over line 23 through the piloting section brush to the wire 24 and to the proper entry device or accumulator. The piloting brush in the tens order will be standing on the 6 or an even spot. Such even spots, as shown, are connected to a wire 25 which leads up to a common strip in the other readout section. With the units brush of this readout also standing on a 5 spot, by tracing the wiring to the emitter, it will be seen that a circuit will be completed from the 2 spot of the emitter to the brush on the 5 spot in the units column then down through wire 25 and out through a wire 26 which leads to an entry receiving device, so that 2 will be entered therein in the tens order. The entry is, however, not complete, there being an additional entry to be made of 3 in the hundreds order. A brush in the piloting section related to the hundreds order will be standing on zero or an even spot. Accordingly, a circuit will be completed from the 3 spot of the emitter 9 through the bus, to the brush in the tens order of the upper section which is standing on the 6 spot out via wire 27 to the wire 28, which leads to an entry receiving device to enter a 3 therein in the hundreds order. It may be explained that the proper carry increment is provided by the wiring to the emitter 9 and also by the piloting arrangement. The principle of operation on which the times five readout works may be set forth as follows: If the amount in a particular column is odd, the multiple readout in that column will be an amount of 5 increased by the carry increment (if any) from the next lower order. If the amount standing in a particular order is even the multiple amount to be read out will be zero plus the carry increment (if any) from the next lower order. The piloting section in effect determines whether the setting is odd or even and controls selectively the readout from the upper section in accordance with such odd or even setting. The actual readout is from the upper section and on the upper section a readout can be made irrespective of whether odd or even amounts are set up therein. The lower section pilots the reading to be read out from the upper section according to whether amounts are odd or even in particular columns. If 75 were setting in the MC entry device the readout of 5 in the units column would be the same as before. The tens order brush of the piloting section is standing on 7, which is an odd amount. The odd piloting circuit is now via wire 23a to the upper section. The upper section units brush is standing on 5, but the wiring connection to the emitter is such that 7 will be read out from the emitter. The 3 in the hundreds order is read out in a similar manner as previously explained.

A readout of the times 5 type may also be used for the direct reading out of one-half the amount standing on the related entry receiving device. To secure a readout of one-half the amount it is only necessary to shift the outgoing lines to the entry receiving device to the next relatively lower order thereof. Switch 70, Fig. 7, shows how this may be effected. If 65 were standing in the entry device, 5 times 65 would be 325, but if the flow to the entry device is altered, the amount may be received as 32.5 or one-half of 65.

*Circuit diagram*

It will be assumed that properly perforated cards are in the supply magazine 29 of the card handling section of the machine (see Fig. 2). To start the machine in operation, switch 30 (Fig. 3c) is first closed to supply current for the main driving motor M (Figs. 1a and 3c) and for the punch driving motor M—2. Rotation of the main driving motor M puts into operation the A. C.-D. C. generator 32 (Figs. 1, 3a and 3c). The A. C. end of this generator supplies current to bus 33 (Figs. 3a and 3b) and to ground and direct current is supplied to buses 34 and 35 (Fig. 3c). The start key is now depressed to close start key contacts 36 and to complete a circuit from the 35 side of the D. C. line through relay coil C, relay contacts G—1 now in the position shown, cam contacts FC—1, to the 34 side of the D. C. line. A stick circuit for relay coils is established through relay contacts C—2 and cam contacts FC—2 now closed. Energization of relay coil C closes relay contacts C—1 establishing a circuit from the 35 side of the D. C. line, through relay contacts F—1, now in the position shown, through card feed clutch magnet 38 (see also Fig. 1a), through cam contacts FC—3 now closed, through stop key contacts 39 now closed, through relay contacts C—1 now closed, through relay contacts N—1 now closed, through punch controlled contacts P—1 now closed and back to line 34. As in former machines the start key must be kept depressed for the first four counter cycles in starting up a run or alternatively, it may be depressed and released and again depressed. Starting operations are prevented until the feed rack of the punch is in proper right hand position, this having been provided for by contacts P—1.

Before starting up the machine the proper plug connections will be made at plug board 40 (see Fig. 3a) so that the amount of the multiplier will be entered from the multiplier field of the card into the MP receiving device. 41MP designate the counter magnets of the MP accumulator. Suitable plug connections are also made to enter the amount of the multiplicand directly into the MC—1 accumulator. 42MC—1 designate the counter magnets of the MC—1 accumulator.

It will be noted that branch entry circuits, generally designated 43 are provided which extend to multi-contacts arranged in groups and respectively designated V1—3, V4—6, V7—9. These multi-contacts are controlled by the energization of their corresponding relay coil V (see Fig. 3c). With coil V energized in a manner to be subsequently described, there will be a concurrent entry of the multiplicand amount into MC—7, MC—9 and MC—3 at the time an entry is made into MC—1. At the end of the first card feed cycle the first card will have been advanced to a point at which it is about to be read by the sensing brushes 19. During the second card feed cycle the card traverses the sensing brushes 19 and the multiplier and multiplicand amounts are read from the card and entered into the proper receiving devices. The multiplicand, it will be understood in this cycle, is entered into MC—1, MC—7, MC—9 and MC—3. At the end of the first card feeding cycle the lower card lever contacts 20 (Figs. 2 and 3c) will be closed by the card sensing energization of relay coil H and causing the relay contacts H—1 (Fig. 3a) to close. As the second card feed cycle ensues, the card is carried past the brushes 19 and the factor amounts are entered into the multiplier and the above mentioned multiplicand counters. The energization of relay coil H has also caused closure of relay contacts H—2, (Fig. 3c). With relay contacts H—2 closed, at the proper time in this cycle upon closure of cam contacts FC—6, relay coil V will become energized and remain energized, long enough to permit the multiplicand entry to also be made in the proper other counters, viz. MC—7, MC—9 and MC—3.

The entry circuits will now be traced. Current flows from the A. C. line 33 (Fig. 3a), through relay contacts H—1 now closed, through cam contacts FC—4 which close at the proper time in the cycle, through impulse distributor 12, through the card transfer and conductor roll 87, thence through the brushes 19 pertaining to the multiplier, through the plug connections at plug board 40 to the multiplier magnets 41MP. Likewise entries of the multiplicand are made directly into MC—1 and through the now closed multi-contacts V1 to 9 inclusive, into MC—7, MC—9 and MC—3.

The hand initiating control is cut off after the machine operations have been properly started. This is brought about in the following manner. At the beginning of the second card feed cycle the closure of cam contacts FC—5 (Fig. 3c) will cause relay coil G to become energized. Current flows from line 35, through relay coil G, through cam contacts FC—5, through the card lever contacts 20 now closed and back to the other side of the line. The energization of relay coil G will shift the relay contacts G—3 and G—1 to a reverse position, the latter contacts interrupting the circuit to the start key contacts 36, but maintaining the circuit to cam contacts FC—1. The energization of relay coil G will also close relay contacts G—2 and establish a stick circuit for relay coils G and H through either of the FC—1 cam contacts or the card lever contacts 20. It may be explained that the making time of cam contacts FC—1 overlaps the time when card lever contacts 20 open between cards. During the latter half of the second card feed cycle, provision is made for reading out double the amount of the multiplicand from the MCRO—2 readout and entering this doubled multiplicand amount into certain other of the multiplicand entry receiving devices. It may be explained that after the entry of the multiplicand itself into the MC—7, MC—9 and MC—3, the relay contacts V1 to 9 inclusive open up upon the opening of cam contacts FC—6 which bring about deenergization of relay coil V. Shortly thereafter cam contacts FC—7 (Fig. 3c) close to energize relay coil W. Relay coil W controls relay contacts W1 to 12 inclusive (Fig. 3a) and upon closure of these contacts and upon operation of the emitter 11 double the amount of the multiplicand will be read out from the MCRO—2 readout section and will be entered into MC—4, MC—9 and MC—3. Following this entry operation the cam contacts FC—7 re-open to de-energize relay coil W.

Before describing the operations which take place on the next machine cycle, it may be explained that while relay coil W was energized supplemental relay contacts W—13 (Fig. 3c) were closed. Accordingly, upon closure of cam contacts FC—9, a circuit is established through relay contacts G—3 to energize relay coil Z. Relay coil Z, once energized, is maintained energized by a stick circuit through relay contacts Z—13 and cam contacts CC—1. These contacts hold over the energization of relay coil Z into the machine cycle following the second card feed cycle. The energization of relay coil Z closes relay contacts Z1 to 12 inclusive (Fig. 3a) which set of contacts are closed during the third setting up cycle. With emitter 11 in operation there will be a readout of two times the amount of the multiplicand from the MCRO—2 readout and the entry of twice the multiplicand into MC—4. In this same cycle there will be a readout of six times the amount of the multiplicand from the MCRO—6 readout and the entry of such amount into MC—7 and MC—9. It may be explained that the supply lines for entering twice the amount of the multiplicand on the second setting up cycle are generally designated 44 (Figs. 3a and 3b), such lines extending to relay contacts V1 to 12 and also to the outgoing lines from the MCRO—2 readout. Such lines 44 are also used during the third counter cycle and supplemental lines generally designated 45 are likewise used in the third setting up cycle for reading out six times the amount of the multiplicand. Such supplemental lines 45 extend from the outgoing lines from the MCRO—6 readout (Fig. 3b) to the Z5 to 12 relay contacts (Fig. 3a).

By the foregoing operations the necessary multiples of the entered multiplicand will be set up so that by the use of the various readout devices all multiples of the entered multiplicand from 1 to 9 are available for readout. It may be explained that with only five entry devices for the entered multiplicand, it is possible to obtain nine available different readouts based on various multiples from 1 to 9.

The card is fed through the card handling section of the machine and ultimately such card passes to the R position in the punch closing card lever contacts 46 (see Figs. 2 and 3c), energizing relay coil F and shifting relay contacts F—1 to reverse position from that shown.

In starting up the machine the usual punch racks (shown in the Cunningham and Oldenboom patents) are in extreme outer position and accordingly contacts P—2, P—3 and P—5 (Fig. 3c) are closed. With contacts P—5 closed, relay coil K will be energized and relay contacts K—1 will be in closed position. Upon the shifting of relay contacts F—1 and upon closure of cam contacts CC—3 a circuit will be established to the punch clutch magnet 47. This circuit is completed through punch contacts P—3 now closed and relay contacts K—1 also closed. Energization of the punch clutch magnet 47 will cause closure of contacts 48 which become latched closed in the usual manner. Accordingly, current supply is provided for the punch driving motor M—2. The card which has been previously read and which is in the punching unit in the R position is now advanced through the punch unit to a position in which punching is to commence.

According to the present invention, multiplication by the readout of selected multiples of the entered multiplicand, i. e. by sub-products, and the set up of the cycle controller is initiated by the reset of the PE accumulator. The PE accumulator reset is initiated as follows. Energization of relay coils F and K in the manner previously explained has caused closure of relay contacts F—2 and K—2 (Fig. 3a). Upon closure of cam contacts CC—2, current flows from line 33, through CC—2, through relay contacts K—2, through relay contacts L—2 now closed, through relay contacts F—2, through the 49PE reset magnet and to ground. Energization of 49PE initiates the resetting of the PE accumulator (Fig. 1). During such reset, reset contacts 16 (Figs. 1 and 3c) close and a circuit is established to energize relay coil L causing opening of relay contacts L—2 (Fig. 3a) to prevent a repetition of PE reset. A stick circuit is established for relay coil L through relay contacts L—1 and such circuit extends to the other side of the line through punch contacts P—2. At the proper time in the operation of the punching unit, the punch contacts P—2 open up to cause the relay coil L to become de-energized. The machine is now ready to set up the cycle controller and to follow with the multiplying operation by the concurrent addition of selected multiples of the entered multiplicand. Upon the reset of the PE accumulator a circuit is established traced as follows: From the 34 side of the D. C. line (Fig. 3a), through the reset contacts 14 of the PE accumulator, through relay coils M and N and back to the other side of the line 35. The energization of relay coil M closes relay contacts M—1 and M—2. Relay contacts M—2 establish a stick circuit for relay coils M and N through the now closed MC—4 reset contacts 17.

It will be assumed that the computation being performed by the machine is that of multiplying the multiplicand amount of 682 by 5473 as the multiplier. In the manner previously explained the amount 682 will be set up in MC—1, double this amount (1364) and five times this amount (3410) being available for readout (see the illustrative computation Fig. 5). The dotted line figures are the amounts available to be read out from the times 2 or "doubling" readout section and the times 5 or the five times section. The entries on successive set up cycles are shown on the following lines of Fig. 5 designated set up cycles and delineated 2 and 3. After the setup cycles have been completed to set up representations of the various multiples of the entered multiplicand or sub-products in the various MC entry devices and upon their various readout devices, the machine is ready to carry out the product entering operations. The multiplier amount of 5473 will be set up in the MP entry device and the first operation of actual multiplying is to effect a multiplication by 3 in the units order with the concurrent multiplication by 7 in the tens order. It may be explained that the MPRO readout has a cycle controller associated with it which includes Y relay coils (Fig. 3a), stick relay contacts Yu—1, etc. and transfer relay contacts Yu—2 and Yu—3, etc. The cycle controller is arranged to skip computing cycles where zeros occur in a column or columns of the multiplier.

With the foregoing computation the brush in the units order of the MPRO readout will be standing upon 3, and the tens order brush will be standing upon 7. Accordingly, upon closure of cam contacts CC—2 (Fig. 3a), current will flow from the A. C. line 33 through CC—2, through relay contacts M—1 now closed, through the Yu—2 and Yt—2 transfer contacts now in the position shown, through the CSu and CSt column shift relay magnets, through the units order brush and the tens order brush which are respectively standing upon 3 and 7 and out to relay coils 3Ro and 7Re. It may be explained that the Ro coils are odd controlling column coils and the Re coils are even controlling coils and that the prefix numeral designates the amount of the multiplier. Thus 7Re designates a multiplier amount of 7 in an even column, in this instance the tens column and 3Ro designates a multiplier amount of 3 in an odd column, in this instance the units column. It may be further explained that the Ro relay coils control the entries into the PO product accumulator and the Re relay coils control the entries into the PE product accumulator. With relay coils 3Ro and 7Re energized, related contacts 3—Ro1—4 and 7—Re1—4 (Fig. 3b) will close and with the emitter 10 in action the sub-product of 7 times the amount of the multiplicand will be read out from the MCRO—7 section and entered into the PE accumulator. 41PE designate the counter magnets of this accumulator. The entries are made through the column shift contacts controlled by relay coil CSt and shown in Fig. 3c. Similarly an entry of 3 times the multiplicand will be read out from MCRO—3 and entered into the PO accumulator, 41PO being the counter magnets of this accumulator. These entries are likewise made through column shift contacts, under the control, in this instance, of the CSu column shift coil.

During the entry of the sub-products, supplemental contacts CSu—3 and CSt—3 (Fig. 3a) close to energize their related relay coils Yu and Yt, which coils upon being energized, shift relay contacts Yu—2 and Yt—2 to reverse position from that shown. The energization of Yu and Yt also causes closure of transfer contacts Yu—3 and Yt—3. The machine will now have the entry of 7 times the multiplicand in the PE accumulator and the entry of 3 times the multiplicand in the PO accumulator. Upon the next countercycle and upon closure of cam contacts CC—2, current will flow through the now shifted Y*t*—2 and Y*u*—2 contacts and through the non-shifted Y*th*—2 and Y*h*—2 contacts to the CS*th* and CS*h* column shift magnets and out via MPRO readout to the 5R*e* and the 4R*o* relay coils. The energization of these relay coils will shift their related relay contacts 5—R*e*I—4 and 4—R*o*I—4 (Fig. 3b) to reverse position from that shown and permit the flow of further entries into the PE and PO accumulators. The column shift contacts shown on Fig. 3c will provide for the directing of the entries into the accumulators in proper shifted over columnar relation therein. There is a shift of two columns. The entries of all sub-products are now made into the product accumulator and all of the Y relay coils will have become energized and all of the transfer contacts Y—3, etc. will be in shifted over position. Accordingly, on the next cycle when cam contacts CC—2 close, a circuit will be completed through all of the Y—3 contacts, through a wire 52, to energize the reset magnets for the multiplier accumulator and the reset magnets for all of the multiplicand accumulators. Such reset magnets are designated 49MP and 49MC—I, etc. (Fig. 3a). The multiplier accumulator and the various multiplicand accumulators will now be reset.

Concurrently with the energization of the reset coils a coil I—CR will be energized. The energization of coil I—CR will cause closure of related relay contacts I—CRI to 6 (Fig. 3c) to complete transfer circuits so that the amount standing in the PO accumulator may be read out from its associated PORO readout device and entered into the PE accumulator. A suitable cable 50 is provided which extends from the PORO readout to the emitter 10. Upon the emitter 10 (Fig. 3b) encountering an extra spot a circuit is completed via the now closed I—CR—7 relay contacts to energize the 49PO reset magnet. The PO accumulator is now reset (see Figs. 3c and 3b). Upon reset of the MC—4 accumulator reset contacts 17 will open to break the stick circuit for relay coils M and W and for all the Y coils thus preparing the cycle controller for a new entry from the following card (see Fig. 3a). The reset of the multiplicand accumulator MC—4, also causes closure of reset contacts 18 (see Fig. 3c) which causes energization of relay coil C. Energization of relay coil C causes closure of relay contacts C—I and there is a re-initiated energization of the card feed clutch magnet 38 to bring about a card feed.

The machine is now ready to punch back the product on the record card, which operation is initiated in the following manner. Early in the re-initiation of the card feed cycle, cam contacts FC—8 (Fig. 3c) close, energizing relay coil B, closing relay contacts B—2 and providing a stick circuit for relay coil B through the PE reset contacts 15 now closed. The energization of relay coil B also closes relay contacts B—I. Current will flow from line 35, through B—I now closed, through the punch escapement contacts 61, via line 62 to the readout strip 63. With the current thus supplied to the readout strip and with the brush of the readout strip standing on the first of the spots at which punching is to commence, the punching operations will start, there being a readout from the PERO readout and an energization of the punch selector magnets 64 in succession. The closure of relay contacts B—I (Fig. 3c) also supplies current to contacts 65 in the punch which contacts are closed by interposer action to supply current to the punch operating magnet 66. Punching now proceeds and will continue until the complete product is read out and punched. When the punching operation is completed contacts P—5 in the punching unit will become closed energizing relay coil K and closing relay contacts K—I to establish a circuit to the ejector magnet 67. The punched card will then be ejected from the punch. A new operation will then be initiated for the succeeding record card. Such succeeding operation is initiated by the closure of relay contacts K—2 and F—2 and upon reset of the PE accumulator as hereinbefore described. It may be explained that upon PE reset contacts 15 open to break the stick circuit for a relay coil B (Fig. 3c) and cause relay contacts B—I to open the circuit to the punch operating magnets and to cut off the circuit to the readout strip 63 of the punch.

The foregoing detailed description has described an operation of the machine involving multiple transferring wherein significant multiplier digits were present in all orders of the multiplier. With such an operation two multiple transfer operations were required,—one for units and tens orders of the multiplier and another for hundreds and thousands of the multiplier, with a further transfer cycle for gathering the amounts into one accumulator. With multiplier amounts which involve one or more intermediate zeros, multiple transfer cycles will also be saved for certain relations of multiplier digits. Consider the following typical multiplier amounts:

5003
0053
5300
0530

It will be noted that with all of the foregoing, that the significant multiplier digits are present in both an even and an odd order considering the units order as odd and the tens order as even and so on. With all such multiplier digit relations there will be a concurrent transfer of both multiples in a single transfer cycle.

Consider now another series of multiplier amounts such as:

(a) 0503
(b) 5030
(c) 0533
(d) 5330
(e) 5303

Inspection of the above set of numbers will show that the significant digits in all cases are present either in a pair of odd orders or in a pair of even orders and for the multiplier numbers (c), (d) and (e) above, these all include a further significant digit in another order. [Note the 3 in the tens or even order in (c), the 3 in the hundreds or odd order in (d), and the 5 in the thousands or even order in (e)]. With all such relations of multiplier digits, provision is made where two significant digits are present, both in even orders or both in odd orders, to transfer the related multiples in successive transfer cycles. For both (a), (b), the 3 multiple would be transferred in the first transfer cycle and the 5 multiple would be transferred in the next following cycle. For multiplier (c), the 3 multiple pertaining to the units order and the 5 multiple pertaining to the hundreds order (both of which orders are odd) would be transferred in successive cycles; but the 3 multiple pertaining to the tens or even order would be effected in the first transfer cycle concurrently with the transfer of the 3 multiple pertaining to the units or odd order. For multiplier (d) the 3 and 5 multiples pertaining to the tens and thousands orders both of which are even would be transferred in a first and following transfer cycle and the 3 multiple pertaining to the hundreds or odd order would be concurrently transferred in the first transfer cycle in which a 3 multiple pertaining to the tens order is being transferred to its related accumulator.

For multiplier (e) the 3 multiple pertaining to the units and hundreds multiplier orders which are both odd would be transferred in successive transfer cycles with the concurrent transfer in the first transfer cycle of the 5 multiple pertaining to the thousands or odd order.

From the foregoing it will be understood that with the present machine there is always a concurrent transfer of a pair of multiples when multiplier digits are present in both an even order and an odd order and that there is a successive multiple transfer when the multiplier digits comprise only a pair of even order digits or comprise only a pair of odd order digits and that there is a combined concurrent and successive multiple transfer when there are a pair of odd order digits with another even order digit or when there are a pair of even order digits with an extra odd order digit.

The action of the cycle controller and the manner in which concurrent or successive transfer is brought about will now be explained in somewhat further detail for some of the foregoing typical multipliers.

For a multiplier amount of 5003, upon PE reset, $Yh$ and $Yt$ are energized due to the detected presence of zeroes in the tens and hundreds order of the multiplier manifested in MPRO. Furthermore, $Yu$ and $Yth$ are de-energized initially. Upon closure of CC—2, since $Yu$—2 are not shifted, $CSu$ will be energized and $3Ro$ will be energized. Concurrently therewith since $Yt$—2 are shifted, current will flow through the now shifted $Yt$—2 contacts, through $Yth$—2 to $CSth$ and to $5Re$. There will be a concurrent transfer of the 3 multiple of the multiplicand into the PO accumulator and of the 5 multiple into the multiplicand into the PE accumulator. It will be understood that the source of the 3 multiple is MCRO—3 and the source of the 5 multiple is MCRO—5. Thereafter the usual transfer to the final result accumulator would occur.

For a multiplier amount of 0053 $Yth$ and $Yh$ would be energized and $Yt$ and $Ytu$ would be energized. Upon the first multiple transfer cycle current would flow from CC—2 both to $CSu$ and $CSt$ and also to $3Ro$ and $5Re$. There will then be a concurrent transfer of the 3 multiple to PO and of the 5 multiple to PE. For a multiplier amount of 5300 $Yu$ and $Yt$ will both be energized due to the zeroes in the units and tens order of the multiplier. $Yu$—2 and $Yt$—2 will both be shifted, interrupting the circuits to $CSu$ and $CSt$ and establishing circuits to $CSh$ and $CSth$ and to 3RO and 5RE and providing for the concurrent transfer of the 3 multiple to PO and the 5 multiple to PE.

For a multiplier amount of 0530, $Yth$ and $Yu$ would be energized and $Yh$ and $Yt$ would be initially de-energized. $Yth$—2 will be open, $Yth$—3 will be closed, $Yu$—2 will be shifted and $Yu$—3 will be closed. Upon closure of CC—2, current will flow through $Yt$—2 in the position shown to the $CSt$ magnet and also to the $3Re$ magnet. Concurrently current will flow from CC—2, through $Yu$—2 in shifted position, through $Yh$—2 now closed, through $CSth$ and also to $5Ro$. With $5Ro$ and $3Re$ concurrently energized, the 3 multiple of the multiplicand will be transferred to PE concurrently with the 5 multiple to PO.

Consider now a multiplier amount such as 0503, here both significant multiplier digits are odd. $Yth$ and $Yt$ will be energized, $Yu$ and $Yh$ will remain de-energized. Upon closure of CC—2 current will flow to $CSu$ and also to $3Ro$. Energization of $3Ro$ will permit transfer of the 3 multiple into the PO accumulator. Since $Yt$ is energized, the $Yt$—2 contacts are shifted so current cannot reach $CSt$ during such transfer cycle. Since $Yu$—2 are in the position shown, current cannot reach the $CSh$ magnet. Since $Yth$ is energized, current cannot reach $CSth$ or any of the RE magnets in this transfer cycle. Toward the end of this transfer cycle, the $Yu$—2 contacts shift in the usual way so that upon the following transfer cycle, upon closure of CC—2, current will now reach $CSh$ and $5Ro$, through the shifted $Yu$—2 contacts, the $Yh$—2 contacts which are in the position shown. This energization of $CSh$ and $5Ro$ will provide for the transfer of the 5 multiple to the PO accumulator in the second transfer cycle. It will be noted that with this control relation both multiples go to a common accumulator, viz., both of them go to the PO accumulator in successive transfer cycles.

Consider now a multiplier such as 5030. Here both significant digits are even. The 3 multiple flows to the PE accumulator in the first transfer cycle and the 5 multiple flows to this same PE accumulator on the following or second transfer cycle. With this multiplier, $Yu$ and $Yh$ are energized. The shaft of the $Yu$—2 prevents current reaching $CSth$ on the first transfer cycle. On the first transfer cycle, current reaches $CSt$, through $Yt$—2 which are in the position shown and current also reaches the $3Re$ magnet. Towards the close of this transfer cycle, the $Yt$—2 contacts shift so that upon the next transfer cycle, upon closure of CC—2, current can reach $CSth$ and $5Re$. During such cycle, current cannot reach $CSh$ because the $Yh$—2 contacts are open.

Consider now a multiplier amount such as 0533. Here it will be noted that there are significant digits in both the even and odd orders of the multiplier, i. e. units and tens order and there is another digit of 5 present in another odd order. $Yth$ will be energized. On the first transfer cycle current can reach $CSt$ and $CSu$ and also $3Ro$ and $3Re$. Since the $Yu$—2 and $Yt$—2 contacts are in the position shown, current cannot reach $CSh$ because of the position of $Yu$—2, nor can current reach $CSth$ because the $CSth$—2 contacts are open. On the first transfer cycle there will be a concurrent transfer of a 3 multiple into PO and PE. Following this cycle, when the $Yu$—2 and $Yt$—2 contacts shift, current supply will be provided for in the next transfer cycle to $CSh$, through the $Yu$—2 contacts in shifted position and through $Yh$—2 now closed. Current in addition to flowing to $CSh$, will flow to $5Ro$ so that on the second transfer cycle, the 5 multiple will be transferred to the PO accumulator.

It seems unnecessary to discuss in detail the circuit relations for the multiplier amount such as 5330. For a multiplier amount such as 5330, the two digits 33 in the hundreds and tens order provide for a concurrent entry of such 3 multiples into the PO and PE accumulator, on a common transfer cycle. The 5 multiple goes to the PE accumulator on the following transfer cycle.

Consider now a multiplier amount such as 5303. Here it will be noted that the first two significant digits encountered from the right are both odd, whereas the 5 digit in the thousands order is even. With such a multiplier, $Yt$ will be initially energized. $Yu$, $Yh$ and $Yth$ are initially deenergized. Upon closure of CC—2, current can reach $CSu$ and $3Ro$, through the $Yu$—2 contacts in the position shown. Since $Yt$—2 contacts are initially shifted, current in this same first transfer cycle can flow through the $Yth$—2 contacts which remain in the position shown to $CSth$ and also to $5Re$. Such circuit relations provide for the concurrent transfer of the 3 multiple pertaining to the units order of the multiplier to PO with the transfer of the 5 multiple pertaining to the thousands order to PE. Upon the next transfer cycle, since the $Yu$—2 contacts are now shifted, current supply is afforded to $CSh$ and to $3Ro$. This will provide for the transfer of the 3 multiple pertaining to the hundreds order in the following transfer cycle.

From the foregoing it will understood that the machine effects multiplication in an extremely rapid manner. Speed is obtained by entering two complete sub-products concurrently into the dual product receiver. One sub-product which is a multiple of the entered multiplicand based upon the digit value of the multiplier may relate to one denominational order of the multiplier and another complete sub-product which is a multiple of the multiplicand may correspond to a digit of the multiplier in a different denominational order. Accordingly, the entry of sub-products may be materially speeded up since multiplication may be effected concurrently by multiplier amounts appearing in multiple or plural orders of the multiplier.

What I claim is:

1. An accounting machine having an emitter and having an entry receiving device in which an amount may be set, a readout associated therewith and connected to the emitter and having settable brush elements receiving settings from said device, said brush elements traversing contacts and selectively establishing circuits therethrough, said readout including a piloting section having settable brush elements receiving like settings from the entry receiving device and which elements also traverse contacts and selectively establish circuit connections therewith, fixed wiring for said readout and piloting section, said piloting section altering the wiring relations to the readout section, the aforesaid fixed wiring and readout alone with the circuit relations through the readout altered by the piloting section cooperating with the emitter providing for the direct readout of a single complete multi-columnar amount which is five times the amount of the entry standing in the entry receiving device and cooperating column shift switching means for further altering the wiring relations out of the readout so that the direct readout of amounts may be provided therefrom which is one-half the entry standing in the entry receiving device.

2. An accounting machine having an entry receiving device in which amounts may be set up, readout devices associated therewith having brush elements positioned thereby traversing contact segments, said readout including a piloting section having correspondingly set brush elements traversing contact segments, emitting means for emitting impulses through said readout differentially timed to represent the digits from one to nine, the aforesaid brushes of the piloting section altering the circuit relations established through the readout, the aforesaid readout including fixed wiring, which fixed wiring and readout alone with the circuit relations through the readout altered by the piloting section cooperating with the emitting means provide for the direct readout of a single complete multi-columnar amount which is five times the amount of the entry standing in the amount receiving devices.

3. A readout device for an entry receiving means of an accounting machine which readout provides for the readout of a complete multiple of any amount upon said entry receiving device, said complete multiple including a carry increment or increments in a higher order or orders due to formation of multiple amounts in a lower order or orders producing such increment or increments, said machine including emitting means for emitting impulses differentially timed to represent the digits from one to nine, said readout comprising a piloting section and a readout section each including plural denominational orders, wiring between the piloting section and the readout section, both sections having segments provided with contacts traversed by settable elements receiving like settings from the entry receiving means, the aforesaid segments of the readout section being connected to the emitting means to provide two alternative paths for each denominational order, said piloting section causing selective emission through the alternate paths of the several denominational orders of the readout section in accordance with odd or even settings of the entry receiving device in corresponding orders to give a readout from each higher order of the readout section which is the carry increment alone resulting from the formation of the multiple of the digit in the adjoining lower order if the higher order setting is even or to give a readout from each higher order of the readout section which is the carry increment resulting from the formation of the multiple of the digit in the adjoining lower order plus five, if the higher order setting is odd.

4. In a multiplying machine comprising devices for predetermining multiplicand multiples including multiplicand receiving means and a plurality of settable source means from which predetermined different complete multiplicand multiples based upon a received multiplicand may be derived, and further comprising result calculating mechanism including multiplier factor manifesting means and result receiving means adapted to accumulate multiples selectively derived from said source means through routing means under control of the manifesting means according to the digital values of the multiplier thereon, and including the combination in which nine settable source means are provided from which all of the different digital multiples of the multiplicand can be derived, said settable source means each having settable elements, five entry receiving devices of accumulating type, including the aforesaid multiplicand receiving means for setting the settable elements of said nine different source means, three of said source means having their settable elements set by said multiplicand receiving means, two other entry receiving devices each setting the settable elements of a pair of source means, and another two of the five receiving means each setting a single source means, and means for setting up the said entry receiving means comprising means to enter a multiplicand in some receiving means and means for transferring multiples of the multiplicand from the settable source means set by receiving means previously set to other receiving means until all the settable source means are so set that all the different digital multiples of the multiplicand can be derived therefrom.

5. A multiplying machine with a product receiver of double accumulator type wherein a transfer is made from one accumulator to another accumulator to obtain the final product in one accumulator, devices for rendering available multiplicand multiples including multiplicand receiving and accumulating means and a plurality of settable source means from which all of the different digital complete multiplicand multiples based upon a received multiplicand may be derived; multiplier entry receiving means manifesting an entered multiplier, entry routing devices between the aforesaid settable source means and both accumulators, means for selectively controlling a pair of said entry routing devices by the multiplier factor manifesting means selectively according to significant digits manifested in each of two different orders thereof, and means for concurrently effecting selected transfer entries of multiplicand multiples from the settable source means to the related receiving accumulators in one receiving cycle of both accumulators.

6. In a multiplying machine, comprising means to enter a multiplier and a multiplicand, devices for rendering available multiplicand multiples including multiplicand receiving and accumulating means and a plurality of settable source means from which predetermined different complete multiplicand multiples based upon a received multiplicand may be derived; the combination of result calculating mechanism including multiplier factor manifesting means and result receiving means adapted to accumulate multiples selectively derived from said source means through routing means under control of the manifesting means according to the digital values of the multiplier thereon, said result receiving means comprising a pair of accumulators with means for transferring amounts from one accumulator to the other, plural multiple sets of multiple routing means between the source means and the accumulators, one set for each accumulator and each set comprising a routing means from each different source means, means to concurrently select two routing means, one in each set for concurrent operation, said means being controlled by odd and even orders of the multiplier factor manifesting means and selected according to the significant digit values of the multiplier manifested in such odd and even orders, means to bring the selected routing means into conjoint operation and transfer means to transfer a pair of multiplicand multiples related to multiplier digit values in said odd and even orders concurrently from the source means to the receiving accumulators in a single transfer cycle of said transfer means.

7. In a multiplying machine, comprising means to enter a multiplier and a multiplicand, devices for rendering available multiplicand multiples including multiplicand receiving and accumulating means and a plurality of settable source means from which predetermined different complete multiplicand multiples based upon a received multiplicand may be derived; the combination of result calculating mechanism including multiplier factor manifesting means and result receiving means adapted to accumulate multiples selectively derived from said source means through routing means under control of the manifesting means according to the digital values of the multiplier thereon, said result receiving means comprising a pair of accumulators with means for transferring amounts from one accumulator to the other, a cyclically operable means, control devices for the routing means controlled by a pair of orders of the multiplier factor manifesting means when both orders manifest significant digits, and controlled selectively according to the digital values of the multiplier in each of said pair of orders for selecting a pair of routing means for operation for concurrently routing multiples related to the said multiplier digits in said pair of orders from the source means to the respective accumulators, said control devices being brought into operation by the cyclically operable means and means to transfer such selected pair of multiples related to different multiplier orders concurrently from the source means to the receiving accumulators in a single transfer cycle of said transfer means.

8. In a multiplying machine, comprising means to enter a multiplier and a multiplicand, devices for rendering available multiplicand multiples including multiplicand receiving and accumulating means and a plurality of settable source means from which predetermined different complete multiplicand multiples based upon a received multiplicand may be derived; the combination of result calculating mechanism including multiplier factor manifesting means comprising paired odd and even adjoining orders and result receiving means adapted to accumulate multiples selectively derived from said source means through routing means under control of the manifesting means according to the digital values of the multiplier thereon, said result receiving means comprising a pair of accumulators with means for transferring amounts from one accumulator to the other, plural sets of multiplicand multiple routing means between the source means and the accumulators, one set for each accumulator and each set comprising a routing means from each different source means, means controlled by a pair of even orders of the multiplier factor manifesting means, according to significant multiplier digit values in each of said orders for selecting successively two routing means both in a common set for successive operation, means controlled by an odd order of the multiplier factor manifesting means according to a manifested significant multiplier digit therein for selecting a routing means of the other set related to said digit for operation concurrently with one of the selected routing means of the first mentioned set, means to bring the routing means selected into concurrent and successive operation and transfer means to transfer the selected multiples from the source means to the receiving accumulators, said transferring means transferring two multiples to two different accumulators in one transfer cycle and transferring another multiple in the following transfer cycle.

9. In a multiplying machine comprising means to enter a multiplier and a multiplicand, devices for rendering available multiplicand multiples including multiplicand receiving and accumulating means and a plurality of settable source means from which predetermined different complete multiplicand multiples based upon a received multiplicand may be derived; the combination of result calculating mechanism including multiplier factor manifesting means comprising paired odd and even adjoining orders and result receiving means adapted to accumulate multiples selectively derived from said source means through routing means under control of the manifesting means according to the digital values of the multiplier thereon, said result receiving means comprising a pair of accumulators with means for transferring amounts from one accumulator to the other, plural sets of entry routing means between the source means and the pair of accumulators, including a set for routing to one accumulator all multiples related to all even order significant multiplier digits and a set for routing to the other accumulator all multiples related to all odd order significant multiplier digits, means for controlling and selecting said routing means by the multiplier factor manifesting means according to significant multiplier digit values manifested therein, one set of routing means being controlled by even orders of the manifesting means and the other set being controlled by odd orders of the manifesting means, transfer means to transfer a multiple or multiples from the source means to the receiving accumulators in one or a succession of transfer cycles, cycle determining and operation enabling means for the entry routing means controlled by the multiplier factor manifesting means according to the order or orders manifesting a significant digit or digits and including a cyclically operable device and means controlled by the last named means to bring the selected routing means for one accumulator into operation to route all of the multiples pertaining to a significant digit containing even orders of the multiplier from the source means to said one accumulator and to bring the selected routing means for the other accumulator into operation to route all of the multiples pertaining to significant digits containing odd orders of the multiplier to said other accumulator.

10. A machine according to claim 9, wherein the means for bringing the routing means into operation include means to bring a selected one of both sets of routing means into concurrent operation upon significant digits being manifested in both an odd and even order whereby the related selected multiples may be concurrently transferred in a single transfer cycle from the source means to both accumulators.

11. A machine according to claim 9, wherein the means for bringing the routing means into operation include means to bring each of a pair of routing means of a common set into successive operation upon significant multiplier digits being manifested in two even orders whereby the related selected multiples may be successively transferred in successive transfer cycles from the source means to a common accumulator.

12. A machine according to claim 9, wherein the means for bringing the routing means into operation include means to bring each of a pair of routing means of a common set into successive operation upon significant multiplier digits being manifested in two odd orders whereby the related selected multiples may be successively transferred in successive transfer cycles from the source means to a common accumulator.

13. In a multiplying machine comprising means to enter a multiplier and a multiplicand, devices for rendering available multiplicand multiples including multiplicand receiving and accumulating means and a plurality of settable source means from which predetermined different complete multiplicand multiples based upon a received multiplicand may be derived, the combination of result calculating mechanism including multiplier factor manifesting means comprising paired odd and even adjoining orders and result receiving means adapted to accumulate multiples selectively derived from said source means through routing means under control of the manifesting means according to the digital values of the multiplier thereon, said result receiving means comprising a pair of accumulators with means for transferring amounts from one accumulator to the other, a plurality of entry routing means, two for each different source means and grouped into one set of routing means for one accumulator and another set for the other accumulator, the routing means of both sets being controlled by and selected for individual operation by the multiplier factor manifesting means according to the digits manifested therein, one set being controlled by even orders of the manifesting means and the other set being controlled by odd orders of the manifesting means, transfer means to transfer a multiple or multiples from the source means to the receiving accumulators in one or a succession of transfer cycles, cycle determining and operation enabling means for the entry routing means controlled by the multiplier factor manifesting means according to the order or orders manifesting a significant digit or digits and including a cyclically operable device, and means controlled by said last named means to bring the selected routing means of one or another or both sets into operation according to the order or orders in which a significant digit or digits are manifested, said means bringing routing means of both sets into operation concurrently in a single transfer cycle when significant digits are manifested in both an even and odd order whereby multiplicand multiples pertaining to two different multiplier orders are concurrently routed and concurrently transferred by the transfer means in a single transfer cycle each to the respective accumulator.

14. A multiplying machine with a plural order receiving means for a multiplier, multiplying means including a pre-calculating section comprising devices for rendering available multiplicand multiples including receiving and accumulating means set according to the multiplicand factor and according to different multiples thereof, a plurality of settable source means set by said receiving means from which different complete multiples based upon a received multiplicand can be derived, and a result calculating section including dual accumulators concurrently operable to receive entries concurrently in each accumulator, multiplicand multiple routing means controlled by a pair of orders of the receiving means for the multiplier factor for selectively routing two multiples related to the digits of the multiplier in such pair of orders from the related source means for concurrent entry respectively into each of the dual accumulators, means to cause such concurrent entries to be made, and means for transferring the result from one accumulator to the other to obtain the final product.

15. A multiplying machine comprising a pre-calculating section with a plurality of settable multiplicand multiple readout means which concurrently afford a possible readout of all of the different complete digital multiples of a multiplicand therefrom, means including receiving and accumulating means for receiving the multiplicand and multiples thereof and for setting the said readout means, including in combination with said pre-calculating section, a multiplier factor manifesting means, product receiving means having dual accumulators with means for transferring amounts from one accumulator to the other, multiplicand multiple routing means controlled by the multiplier factor manifesting means for selectively routing two multiples corresponding to multiplier digits in two orders of the multiplier for entry from the multiple readout means of the pre-calculating section into the products receiving accumulators, and means for causing the concurrent entry of the plurality of multiples so selected whereby multiples pertaining to more than one digit may be entered concurrently and operating time saved accordingly.

16. A multiplying machine including settable source means for different amounts representing the multiplicand and multiples thereof, means to set said settable source means so that different complete multiples based upon a received multiplicand can be derived therefrom, product receiving means of dual accumulator type with means for transferring amounts from one accumulator to the other accumulator, plural order multiplier factor manifesting means, multiplicand multiple routing means controlled thereby for selectively directing a multiple or a plurality of multiples corresponding to a multiplier digit or digits in one or two orders of the multiplier from the related source means into the product accumulator or accumulators for entry therein, and means for causing a single entry to be effected in one accumulator or a plurality of entries to be concurrently effected into two accumulators in a single accumulating cycle of the product accumulators depending upon whether one or two orders of the multiplier factor manifesting means contain significant digits.

17. In a machine for effecting multiplication comprising devices for predetermining multiplicand multiples including settable source means for rendering available different amounts representing the multiplicand and all of the different digital multiples thereof, means to cause said devices to set said settable source means so that all the different digital complete multiples based upon a received multiplicand can be derived therefrom, and a multi-denominational multiplier factor manifesting means; in combination with product receiving means comprising plural accumulators into which multiples are selectively entered from the multiplicand multiple source means under the directed control of the multiplier factor manifesting means and in accordance with multiplier digits thereon, routing means selectively controlled by the multiplier factor manifesting means in accordance with significant multiplier digits in dual orders thereof for concurrently, selectively routing for concurrent entry into the products accumulators corresponding multiples from the settable source means, and means for causing such pre-selected multiples to be entered from the selected multiple source means concurrently in a single entry cycle of the products accumulators.

18. In a multiplying machine, product accumulating means, sub-product means from which different sub-products based on the multiplicand may be derived for entry in said accumulating means, multiplier factor manifesting means, entry routing means selectively controlled thereby and between the sub-product means and the product accumulating means for concurrently selectively routing sub-products related to two different digits in different orders of the multiplier for concurrent entry into the product accumulating means, column shift means intermediate the sub-product means and the product accumulating means, and means to control the column shift means from the multiplier factor manifesting means to effect column shifts by pairs of denominational orders after concurrent product entries are made.

19. In a machine according to claim 18 wherein the denominational orders of the multiplier factor manifesting means control said column shift means in a given pairing relation when significant digits are present in all denominational orders and wherein further means controlled by said manifesting means are provided to change the pairing relation when zeros occur in certain denominational orders.

20. In a multiplying machine of the class described, wherein pre-calculating means is provided having readout means from which each of all of the digital multiples of a multiplicand may be directly read out, and having means for causing said multiples to be rendered available in said readout means, and wherein products are computed by selectively entering multiples from the aforesaid readout means into a product receiving means under the directed control of a multiplier factor manifesting means and in accordance with multiplier digits thereon, the combination with such pre-calculating means, of dual products receiving accumulators, a multiplier factor manifesting means, selecting means controlled by said multiplier factor manifesting means and effective concurrently in accordance with significant multiplier digits in two orders thereof for concurrently selecting for concurrent entry into the products receiving accumulators corresponding multiplicand multiples from the readout means for such multiples, and means for causing such pre-selected multiples to be entered from the selected readout means concurrently into the product accumulators.

21. In a multiplying machine comprising cyclically operating calculating means and a multiplier manifesting means having alternate odd and even denominational orders, a cycle controller for enabling odd and even denominational orders of said manifesting means in pairs to control operation of said calculating means during a single cycle of operation, and including means for eliminating a cycle of operation when no significant digits occur in an odd and even order of the manifesting means.

22. In a multiplying machine comprising a multiplier manifesting means, a cycle controlling mechanism cooperating therewith for determining the number of machine cycles necessary to solve a given problem, said controller comprising devices normally arranged to cooperate with determined successive pairs of denominational orders of said manifesting means, each pair including an odd and even order to cause a single cycle of machine operation for each pair of any possible significant manifested digits, and including means for causing said devices to cooperate with pairs of denominational orders other than said determined pairs when no significant digit is present in an order of a determined pair of denominational orders but significant digits are present in any one odd order in any one even order of the manifesting means.

23. A cycle controller for controlling the number of product forming cycles of result calculating devices of a multiplying machine, said machine having multiplier factor manifesting means comprising alternate odd and even orders and a cyclically operable means for causing product forming operations; means to enter a multiplier, said cycle controller including devices set up individually for each order of the entered multiplier depending upon the presence or absence of a significant digit therein and effective in pairs, each pair related to an odd and even multiplier order, and means controlled by said devices to determine a single product forming cycle of the result calculating devices under the control of the cyclically operable means for any significant multiplier digits in two orders which orders comprise both an odd order and an even order.

24. In a multiplying machine having a multiplier factor manifesting means comprising plural alternate odd and even denominational orders, and a cyclically operating computing mechanism, a cycle controller cooperating with said manifesting means for determining the number of cycles of said mechanism required in calculating the product of a given problem, said cycle controller comprising a cyclically operable means and a plurality of settable elements for causing control of said computing mechanism by orders of the multiplier factor manifesting means, said settable elements being grouped in two groups, one cooperating with the odd orders of the manifesting means and the other with the even orders thereof, each group being separately connected to said cyclically operable means, whereby upon each operation of said last means one odd and one even order of the manifesting means containing significant digits is rendered effective to control the computing mechanism during a single cycle of operation.

25. A machine according to claim 24 wherein said cycle controller comprises means for detecting the presence or absence of significant digits in the entered multiplier and wherein said means controls said settable elements to omit control by the denominational orders of the manifesting means which do not contain significant digits.

26. A multiplying machine including in combination plural sub-product receiving accumulators, means for transferring amounts from accumulator to accumulator and for obtaining the final product in one accumulator, said plural accumulators being adapted to receive concurrent sub-product entries, calculating means including devices for predetermining sub-products representing multiplicand multiples in advance of their entry in the sub-product receiving accumulators and including a plurality of settable source means from which different complete multiples based upon a received multiplicand may be derived, means for manifesting an entered multiplier, means controlled thereby for routing selected multiples from the source means to the receiving accumulators, means to transfer such multiples, and means for controlling both of the last two mentioned means for the effecting of the selective routing and transfers required to complete multiplication of a given multiplicand by a multi-denominational multiplier, comprising significant digits in all orders with the total number of orders being a multiple of the number of accumulators, in a number of entry cycles into the product accumulators, which is equal to the number of orders in the multiplier divided by the number of accumulators.

ARTHUR H. DICKINSON.